United States Patent
Hsieh

(10) Patent No.: US 10,259,526 B2
(45) Date of Patent: Apr. 16, 2019

(54) ASSEMBLING STRUCTURE FOR CRANK AND PEDAL

(71) Applicant: Chin-Long Hsieh, Taichung (TW)

(72) Inventor: Chin-Long Hsieh, Taichung (TW)

(*) Notice: Subject to any disclaimer, the term of this patent is extended or adjusted under 35 U.S.C. 154(b) by 0 days.

(21) Appl. No.: 15/680,193

(22) Filed: Aug. 17, 2017

(65) Prior Publication Data
US 2019/0031282 A1 Jan. 31, 2019

(30) Foreign Application Priority Data

Jul. 28, 2017 (TW) .............................. 106125620 A
Jul. 28, 2017 (TW) .............................. 106211190 U

(51) Int. Cl.
*B62M 3/08* (2006.01)
*B62M 3/00* (2006.01)

(52) U.S. Cl.
CPC ................ *B62M 3/08* (2013.01); *B62M 3/00* (2013.01); *Y10T 74/2168* (2015.01)

(58) Field of Classification Search
CPC ........ B62M 3/00; B62M 3/08; Y10T 74/2168
See application file for complete search history.

(56) References Cited

U.S. PATENT DOCUMENTS

| | | | |
|---|---|---|---|
| 7,562,891 B2* | 7/2009 | Bouchez | B62M 3/04 280/294 |
| 2005/0016323 A1* | 1/2005 | Dal Pra' | B62K 19/16 74/594.1 |
| 2006/0288819 A1* | 12/2006 | Dal Pra' | B62M 3/00 74/594.3 |
| 2012/0048060 A1* | 3/2012 | Arnold | B62M 3/08 74/594.4 |
| 2012/0090424 A1* | 4/2012 | Curran | B62M 3/08 74/594.4 |
| 2015/0122078 A1* | 5/2015 | Chen | B62M 3/08 74/594.4 |
| 2017/0096188 A1* | 4/2017 | Bigolin | B62M 3/08 |

FOREIGN PATENT DOCUMENTS

DE 850275 C * 9/1952 .............. B62M 3/00

* cited by examiner

*Primary Examiner* — Patrick Cicchino

(57) ABSTRACT

The invention includes a crank, a pedal and a fastener. The crank has a flower-shaped keyed hole at an outboard end thereof. The pedal has a body and a spindle with a connecting end. The connecting end is formed with flower-shaped keys corresponding to the flower-shaped keyed hole so that the connecting end is inserted into the flower-shaped keyed hole with engagement between the flower-shaped keyed hole and the flower-shaped keys. An end surface of the connecting end is formed with a first threaded hole. The fastener passes through the flower-shaped keyed hole and screws into the first threaded hole for fixing the connecting end of the spindle to the crank.

13 Claims, 8 Drawing Sheets

ASSEMBLING STRUCTURE FOR CRANK AND PEDAL

BACKGROUND OF THE INVENTION

1. Technical Field

The invention relates to bicycles, particularly to connection between a pedal and a crank.

2. Related Art

With development of decades, bicycles have been very popular in exercise, recreation and transportation. A spindle of the conventional pedal is threaded to match a threaded hole at the outboard end of the cranks. Because the direction of the thread on the spindle is almost the same as the direction of the force exerted by a rider's leg, the spindle is easy to be broken. The more heavy the rider's weight is, the more easily the spindle is broken.

On the other hand, for the sake of lightweight, some cranks are made of aluminum alloy. Because aluminum alloy is not tough enough, some pedals are additionally provided with a hard bushing around the spindle to prevent thread damage of the crank. Such a design will increase the manufacturing cost.

Further, the right-side (usually the drive-side) pedal spindle is right-hand threaded, and the left-side (usually the non-drive-side) pedal spindle is left-hand (reverse) threaded to help prevent it from becoming loose by an effect called precession. This will also cause inconvenience and disadvantage in assembling and preparation.

SUMMARY OF THE INVENTION

An object of the invention is to provide an assembling structure for a crank and a pedal, which adopts a connection of a flower-shaped keyed hole and flower-shaped keys to replace screwing. This can enhance strength of the pedal spindle and avoid distinguishing left one and right one to reduce the manufacturing cost.

To accomplish the above object, the assembling structure for a crank and a pedal of the invention includes a crank, a pedal and a fastener. The crank has a flower-shaped keyed hole at an outboard end thereof. The pedal has a body and a spindle with a connecting end. The connecting end is formed with flower-shaped keys corresponding to the flower-shaped keyed hole so that the connecting end is inserted into the flower-shaped keyed hole with engagement between the flower-shaped keyed hole and the flower-shaped keys. An end surface of the connecting end is formed with a first threaded hole. The fastener passes through the flower-shaped keyed hole and screws into the first threaded hole for fixing the connecting end of the spindle to the crank.

DETAILED DESCRIPTION OF THE INVENTION

Figure 1:
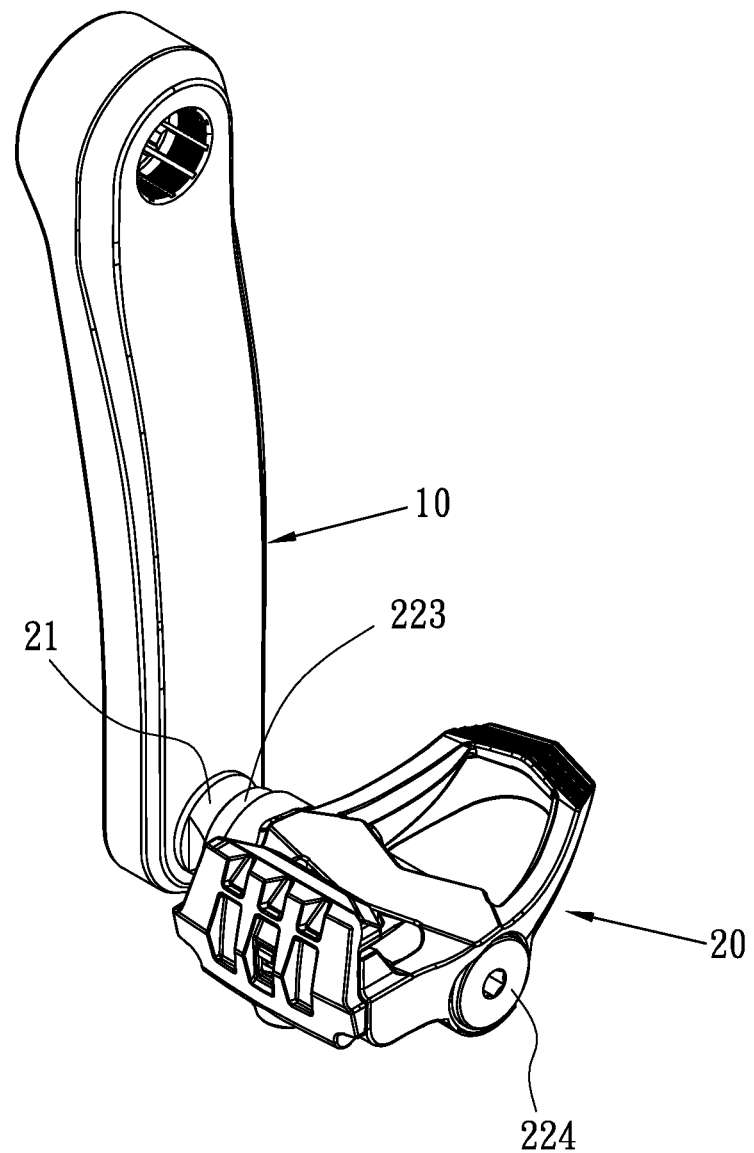
FIG. 1 is a perspective view of the first embodiment of the invention.
Figure 2:
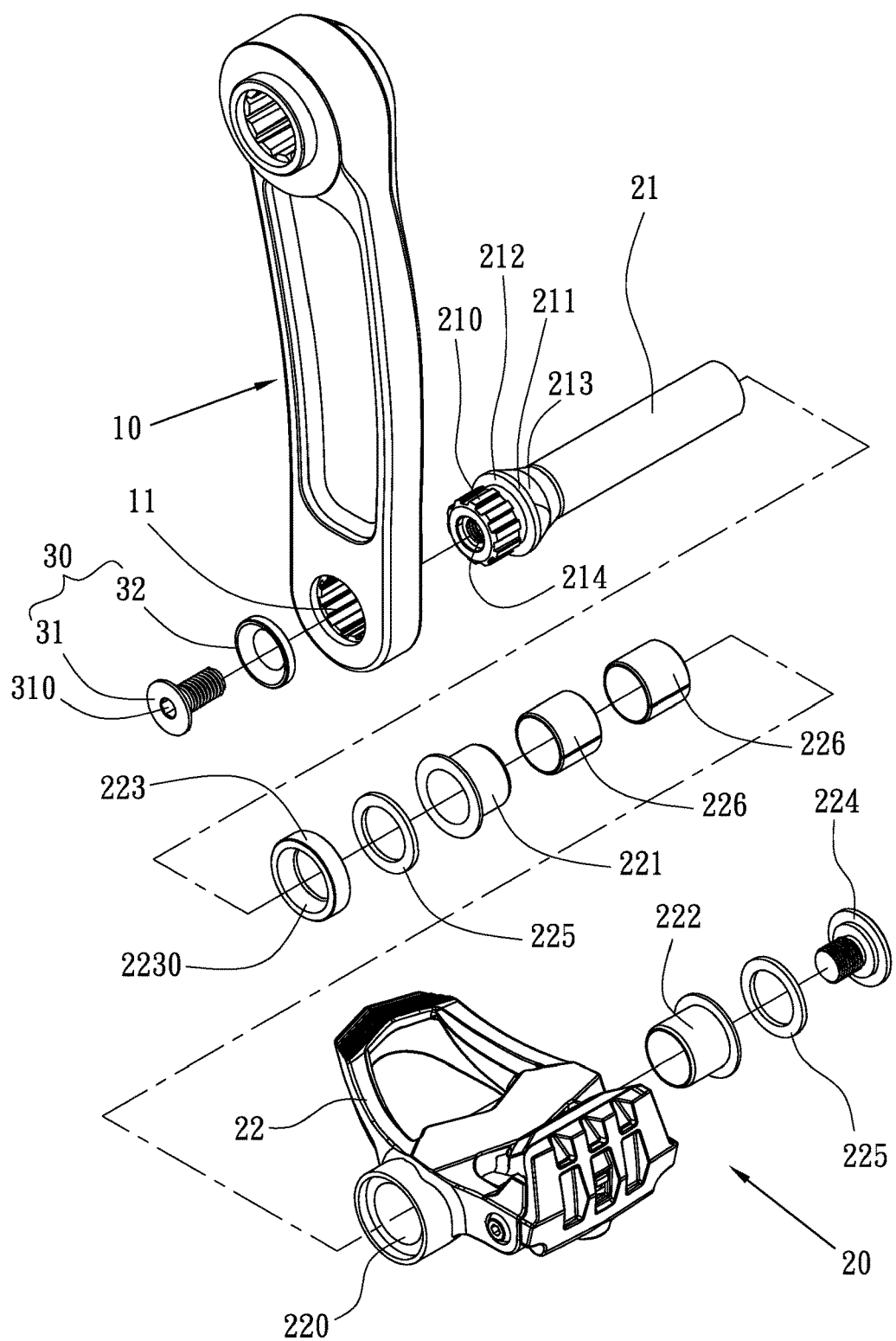
FIG. 2 is an exploded view of the first embodiment of the invention.
Figure 3:
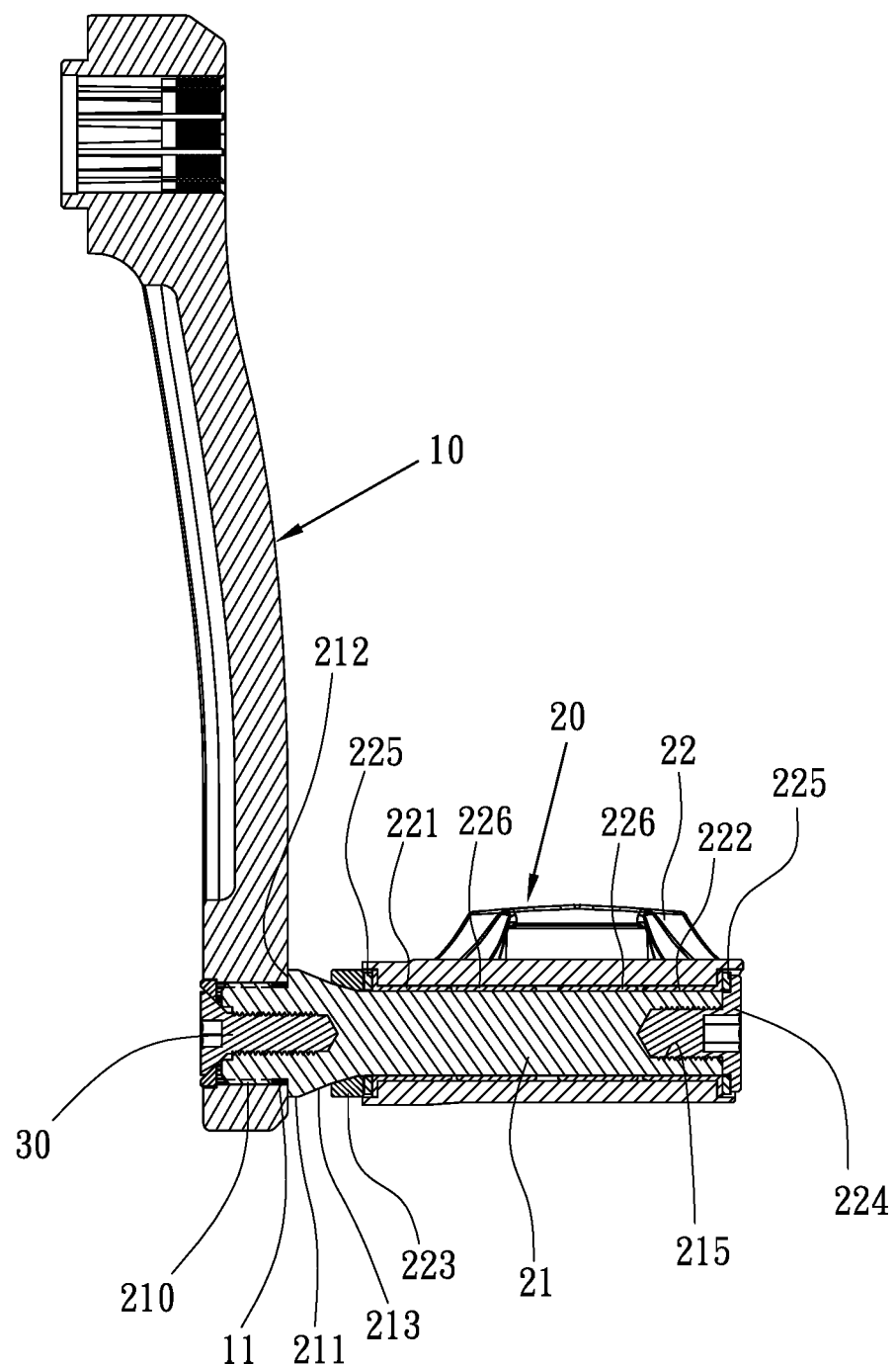
FIG. 3 is a cross-sectional view of the first embodiment of the invention.

Please refer to FIGS. 1-3. The invention provides an assembling structure for a crank and a pedal, which includes a crank 10 and a pedal 20. The crank 10 has a flower-shaped keyed hole 11 at an outboard end thereof for connecting the pedal 20. The pedal 20 has a body 22 and a spindle 21 with a connecting end. The connecting end is formed with flower-shaped keys 210 corresponding to the flower-shaped keyed hole 11 so that the connecting end can be inserted into the flower-shaped keyed hole 11 with tight engagement between the flower-shaped keyed hole 11 and the flower-shaped keys 210. A flange 211 is formed on the spindle 21. The flange 211 abuts against the flower-shaped keys 210. A side of the flange 211, which abuts against the flower-shaped keys 210, is a flat 212, and the other side thereof is a tapered conic section 213. The flat 212 abuts against the crank 10 around the flower-shaped keyed hole 11 when the connecting end of the spindle 21 is completely inserted into the flower-shaped keyed hole 11.

An end surface of the connecting end is formed with a first threaded hole 214. The other end surface of the spindle 21 is formed with a second threaded hole 215. A fastener 30 passes through the flower-shaped keyed hole 11 and is screwed into the first threaded hole 214 for fixing the connecting end of the spindle 21 to the crank 10. Each of two ends of a spindle hole 220 of the body 22 of the pedal 20 is provided with a bearing 221, 222. A buffering bushing 223 is sandwiched between the flange 211 and the body 22. The buffering bushing 223 is formed with a conic hole 2230 correspondingly connecting with the conic section 213 of the flange 211. A hex socket cap screw 224 is screwed with the second threaded hole 215. The buffering bushing 223 can guarantee the body 22 can rotate about the spindle 21.

The spindle 21 of the pedal 10 is fixed to the crank 10 by the connection of a flower-shaped keyed hole 11 and flower-shaped keys 210. This can enhance strength of the pedal spindle 21 and avoid distinguishing left one and right one to reduce the manufacturing cost. Also, the flange abutting against the crank 10 can improve the connective strength between the spindle 21 and the crank 10.

The flower-shaped keyed hole 11 and the flower-shaped keys 210 are wheel-shaped teeth which are arranged in protrusions and recesses and have Mohs taper.

Each of the bearings 221, 222 of the body 22 of the pedal 20 is further provided with a washer 225.

The bearings 221, 222 are self-lubricating bearings.

The fastener 30 is consisted of a bolt 31 and a washer 32. The head of the bolt 31 has a hexagon hole 310.

Figure 4:
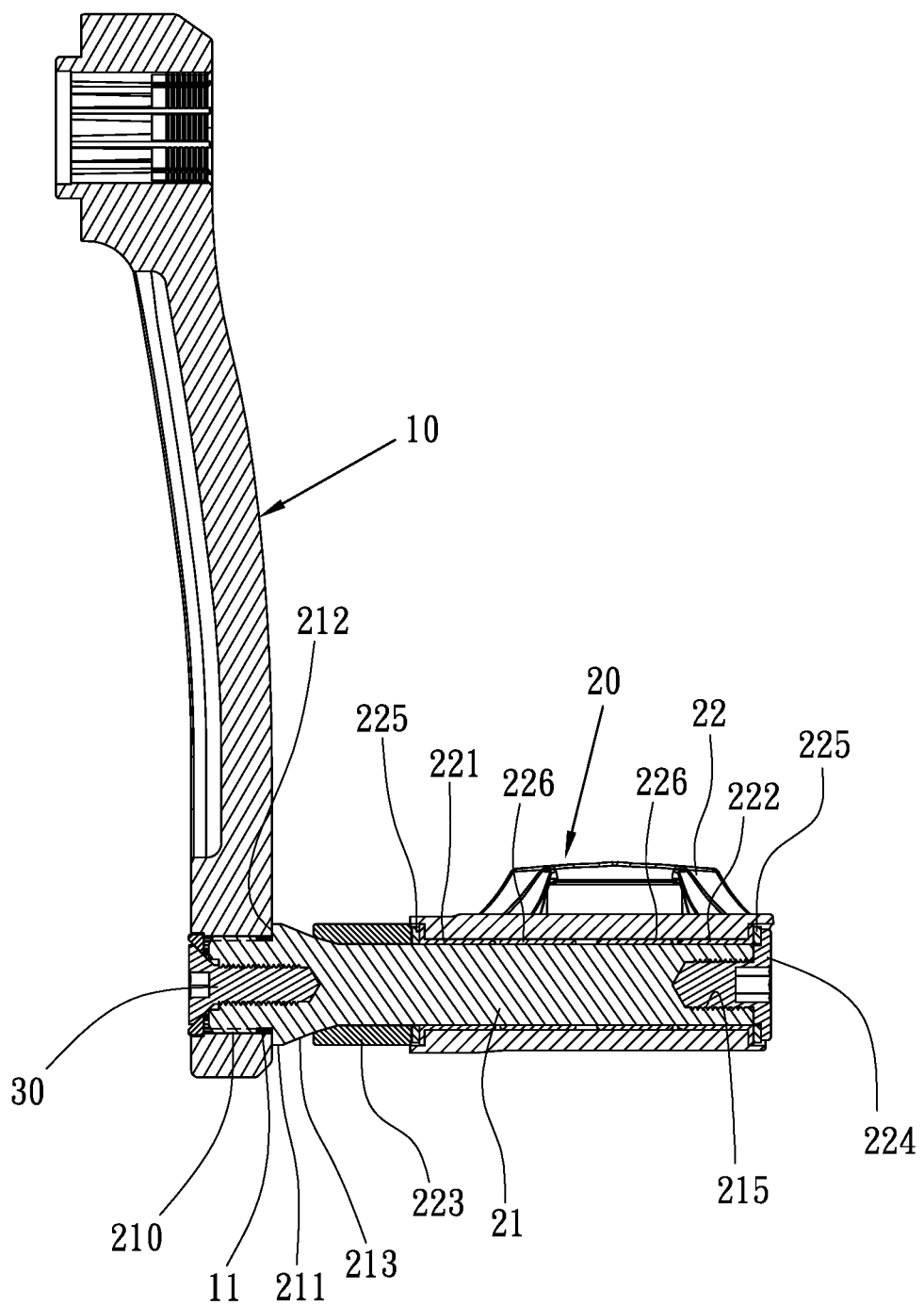
FIG. 4 is a cross-sectional view of another mode of the first embodiment of the invention.

The buffering bushing 223 can be varied in thickness or quantity to match different length of the spindle 21 as shown in FIG. 4.

At least one of the bearings 221, 222 is a self-lubricating bearing 226.

Figure 5:
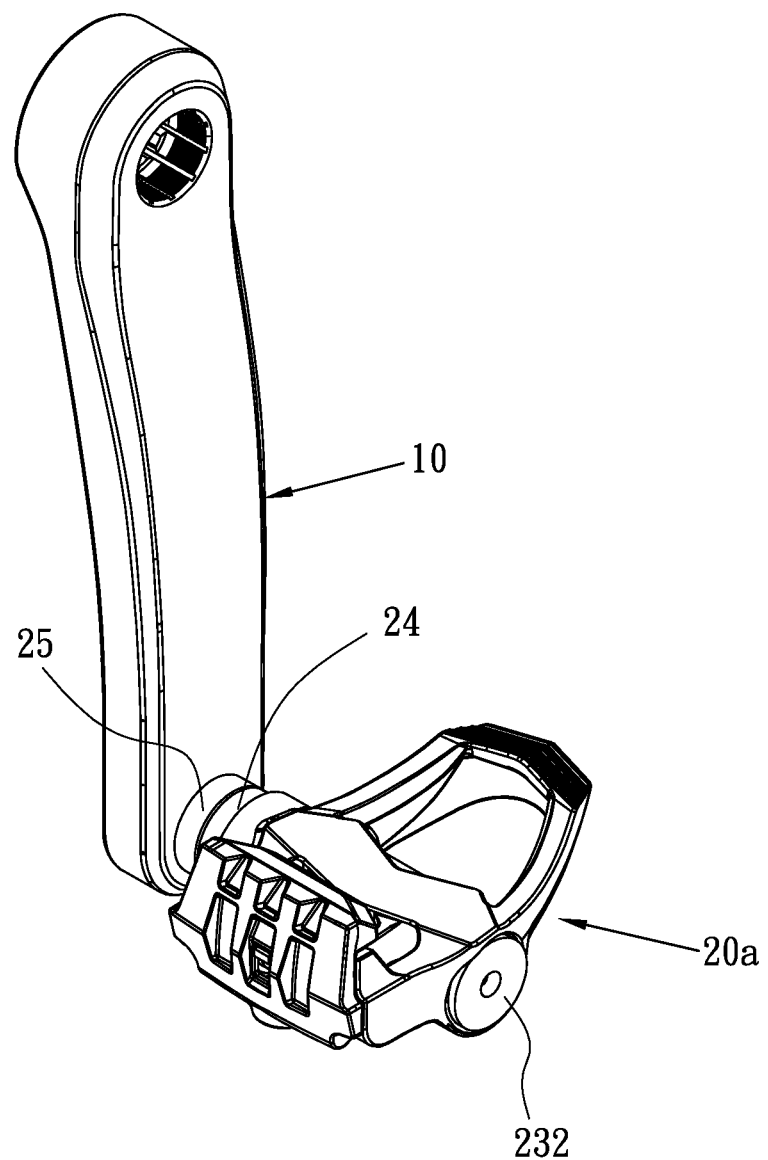
FIG. 5 is a perspective view of the second embodiment of the invention.
Figure 6:
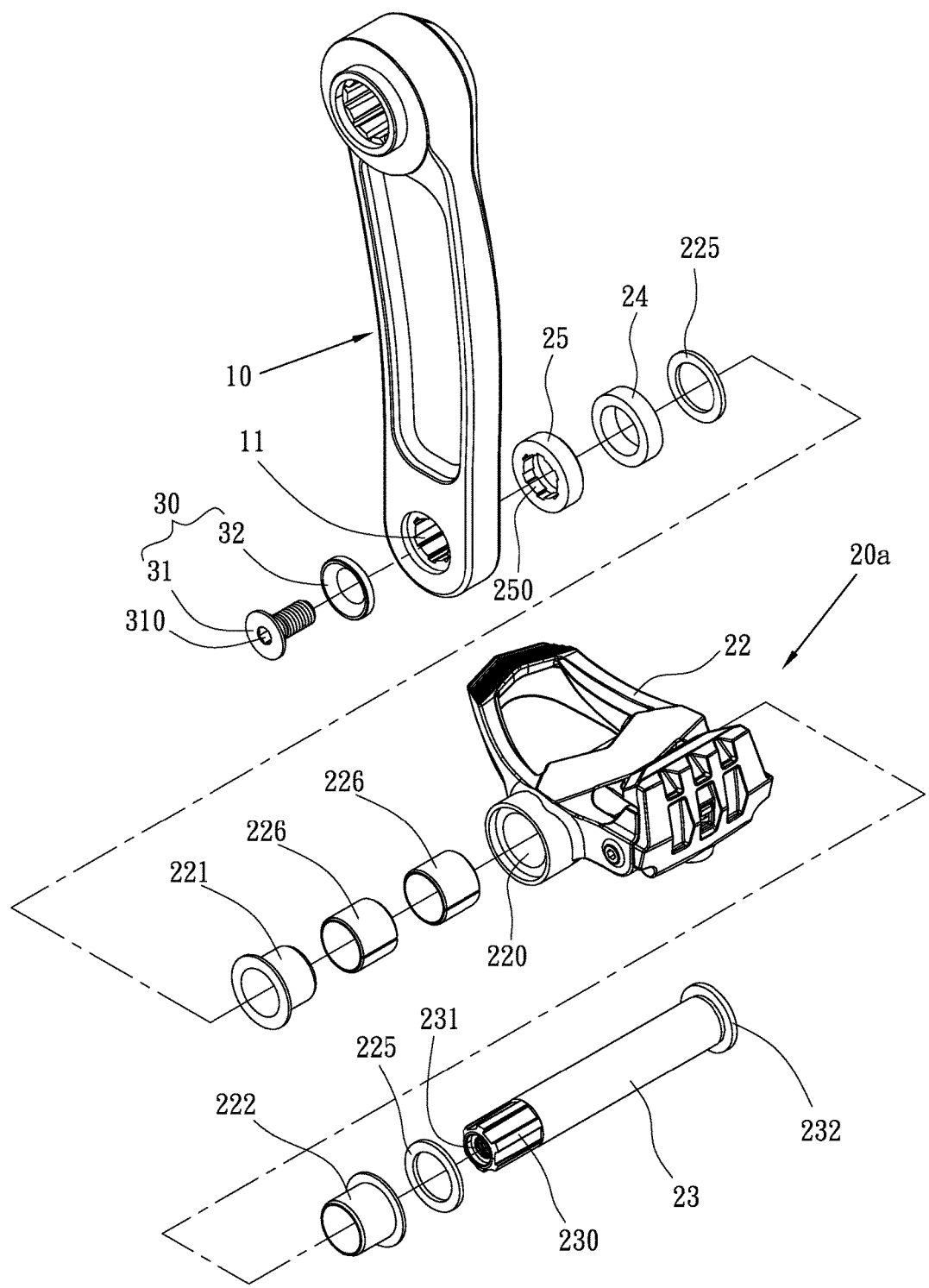
FIG. 6 is an exploded view of the second embodiment of the invention.
Figure 7:
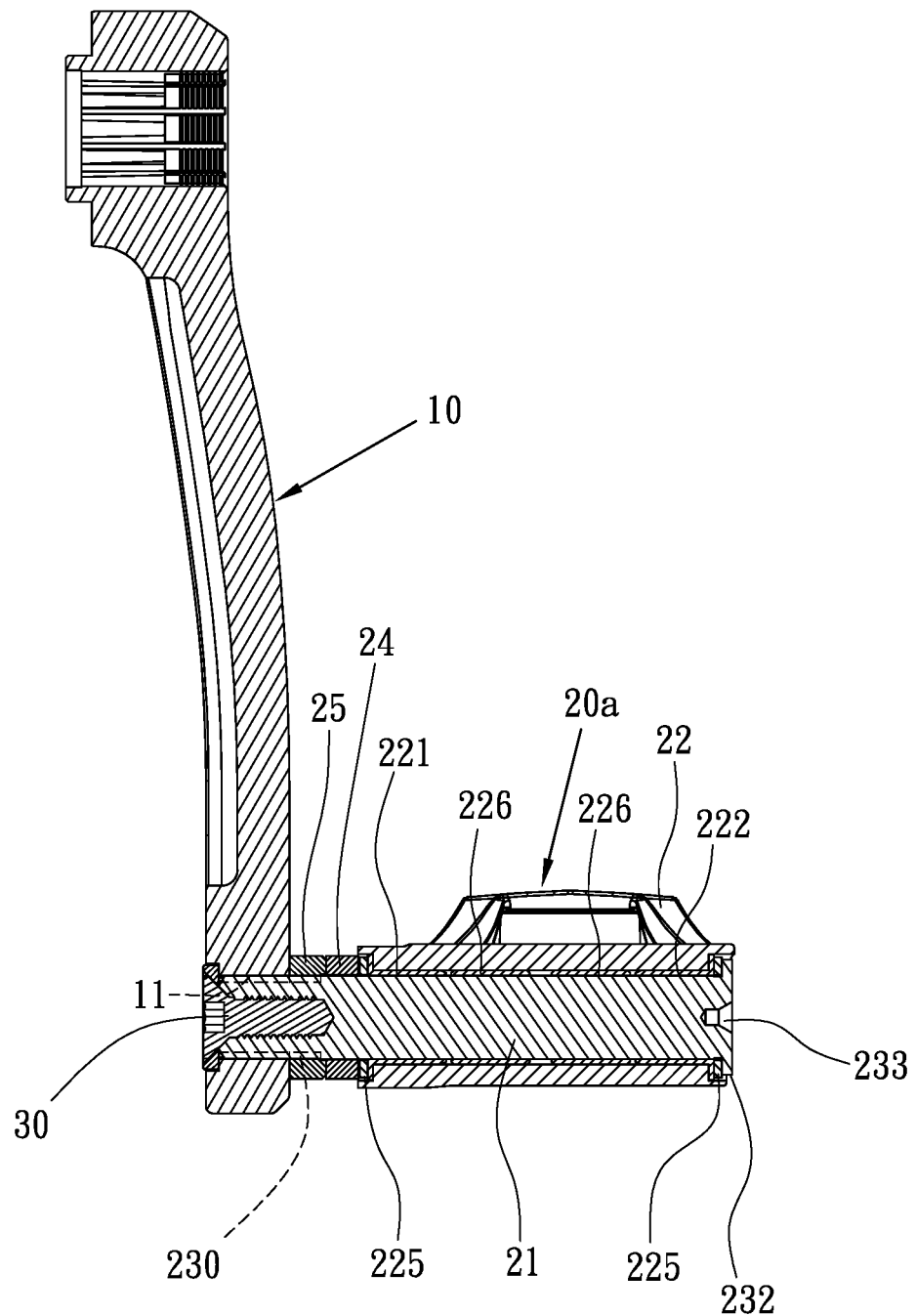
FIG. 7 is a cross-sectional view of the second embodiment of the invention.

Please refer to FIGS. 5-7, which show the second embodiment of the invention. The embodiment includes a crank 10 and a pedal 20a. The crank 10 has a flower-shaped keyed hole 11 at an outboard end thereof for connecting the pedal 20. The pedal 20 has a body 22 and a spindle 23 with a connecting end. The connecting end is formed with flower-shaped keys 230 corresponding to the flower-shaped keyed hole 11 so that the connecting end can be inserted into the flower-shaped keyed hole 11 with tight engagement between the flower-shaped keyed hole 11 and the flower-shaped keys 230. An end surface of the connecting end is formed with a threaded hole 231. A flange 232 is formed on an outer end of the spindle 21. A hexagon hole 233 is formed in the flange 232.

Each of two ends of a spindle hole 220 of the body 22 of the pedal 20 is provided with a bearing 221, 222. An adjustment sleeve 24 and a limiting sleeve 25 are put around the spindle 23. The limiting sleeve 25 has an inner hole 250 corresponding to the flower-shaped keys 230 so as to be limited at the bottom of the flower-shaped keys 230. When the connecting end of the spindle 23 is completely inserted into the flower-shaped keyed hole 11, a fastener 30 passes through the flower-shaped keyed hole 11 and is screwed into the threaded hole 231 to fix the spindle 23 to the crank 10. The limiting sleeve 25 abuts against the crank 10 around the flower-shaped keyed hole 11. The adjustment sleeve 24 can be used to keep a gap between the limiting sleeve 25 and the body 22. This can guarantee the body 22 can rotate about the spindle 23.

The flower-shaped keyed hole 11 and the flower-shaped keys 230 are wheel-shaped teeth which are arranged in protrusions and recesses and have Mohs taper.

Each of the bearings 221, 222 of the body 22 of the pedal 20a is further provided with a washer 225.

The bearings 221, 222 are self-lubricating bearings.

The fastener 30 is consisted of a bolt 31 and a washer 32. The head of the bolt 31 has a hexagon hole 310.

Figure 8:
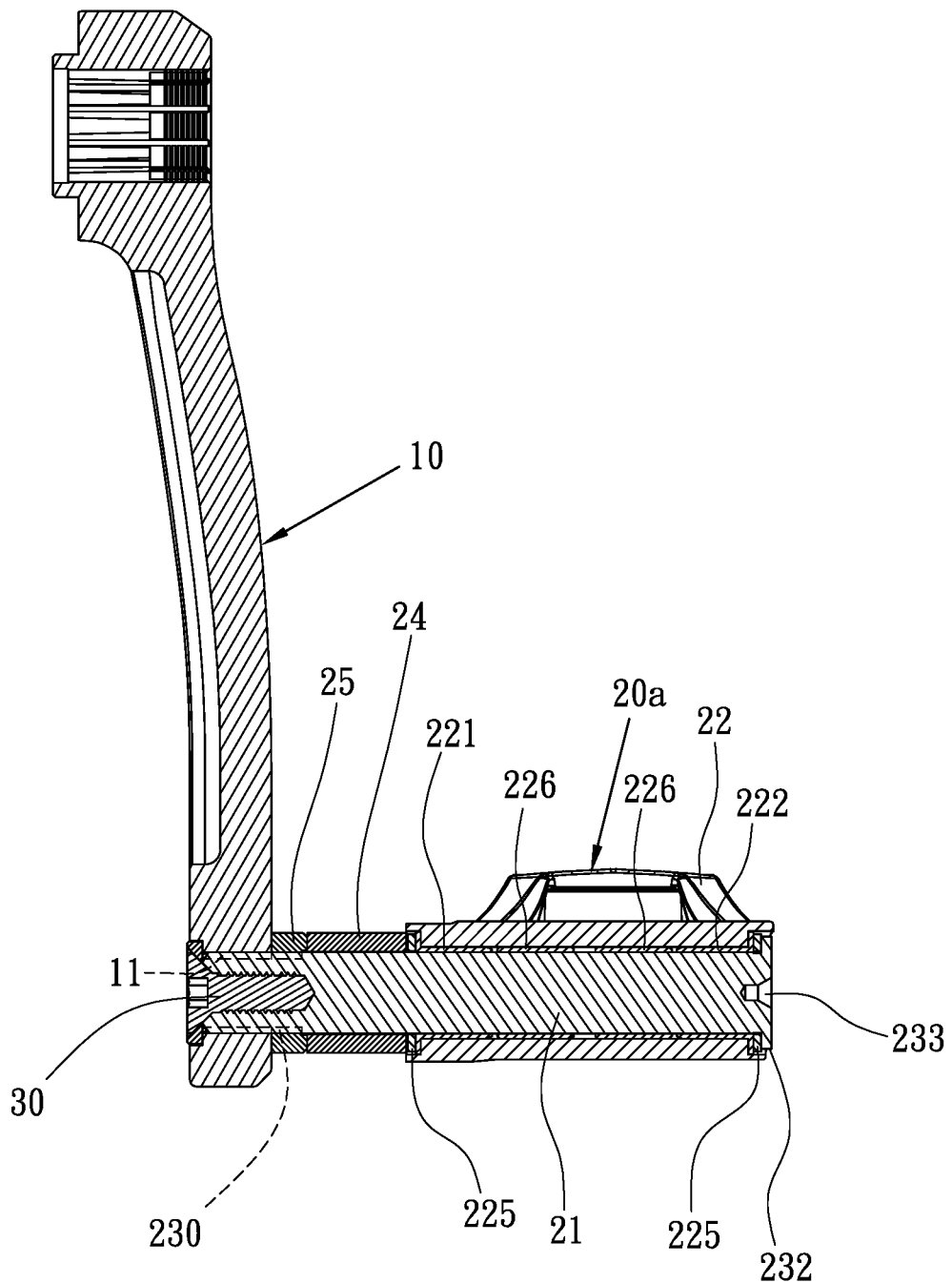
FIG. 8 is a cross-sectional view of another mode of the second embodiment of the invention.

The adjustment sleeve 24 can be varied in thickness or quantity to match different length of the spindle 23 as shown in FIG. 8.

At least one of the bearings 221, 222 is a self-lubricating bearing 226.

It will be appreciated by persons skilled in the art that the above embodiments have been described by way of example only and not in any limitative sense, and that various alterations and modifications are possible without departure from the scope of the invention as defined by the appended claims.

What is claimed is:

1. An assembling structure for a bicycle, comprising:
a crank, having a flower-shaped keyed hole at an outboard end thereof;
a pedal, having a body and a spindle with a connecting end, the connecting end being formed with flower-shaped keys corresponding to the flower-shaped keyed hole so that the connecting end is inserted into the flower-shaped keyed hole with engagement between the flower-shaped keyed hole and the flower-shaped keys, and an end surface of the connecting end being formed with a first threaded hole; and
a fastener passing through the flower-shaped keyed hole and being screwed into the first threaded hole for fixing the connecting end of the spindle to the crank;
wherein a flange is formed on the spindle, the flange is adjacent to and protrudent from the flower-shaped keys, the flange abuts against the crank around the flower-shaped keyed hole, and the flange has a conic section, and a buffering bushing is sandwiched between the conic section and the body of the pedal.

2. The assembling structure of claim 1, wherein the buffering bushing is formed with a conic hole correspondingly connecting with the conic section of the flange.

3. The assembling structure of claim 1, wherein the flower-shaped keyed hole and the flower-shaped keys are wheel-shaped teeth which are arranged in protrusions and recesses.

4. The assembling structure of claim 1, wherein each of two ends of a spindle hole of the body of the pedal is provided with a bearing.

5. The assembling structure of claim 4, wherein each of the bearings is further provided with a washer.

6. The assembling structure of claim 1, wherein the fastener is consisted of a bolt and a washer, and a head of the bolt has a hexagon hole.

7. The assembling structure of claim 1, wherein another end surface of the spindle is formed with a second threaded hole, and a screw is screwed with the second threaded hole.

8. An assembling structure for a bicycle, comprising:
a crank, having a flower-shaped keyed hole at an outboard end thereof;
a pedal, having a body and a spindle with a connecting end, the connecting end being formed with flower-shaped keys corresponding to the flower-shaped keyed hole so that the connecting end is inserted into the flower-shaped keyed hole with engagement between the flower-shaped keyed hole and the flower-shaped keys, and an end surface of the connecting end being formed with a first threaded hole; and
a fastener passing through the flower-shaped keyed hole and being screwed into the first threaded hole for fixing the connecting end of the spindle to the crank;
wherein a flange is formed on an outer end of the spindle, and a hexagon hole is formed in the flange.

9. An assembling structure for a bicycle, comprising:
a crank, having a flower-shaped keyed hole at an outboard end thereof;
a pedal, having a body and a spindle with a connecting end, the connecting end being formed with flower-shaped keys corresponding to the flower-shaped keyed hole so that the connecting end is inserted into the flower-shaped keyed hole with engagement between the flower-shaped keyed hole and the flower-shaped keys, and an end surface of the connecting end being formed with a first threaded hole; and
a fastener passing through the flower-shaped keyed hole and being screwed into the first threaded hole for fixing the connecting end of the spindle to the crank;
wherein a flange is formed on an outer end of the spindle, an adjustment sleeve and a limiting sleeve are put around the spindle to be sandwiched between the crank and the body of the pedal, the limiting sleeve has an inner hole corresponding to the flower-shaped keys so as to be limited at a bottom of the flower-shaped keys, and the limiting sleeve abuts against the crank around the flower-shaped keyed hole.

10. The assembling structure of claim 8, wherein the flower-shaped keyed hole and the flower-shaped keys are wheel-shaped teeth which are arranged in protrusions and recesses.

11. The assembling structure of claim 8, wherein each of two ends of a spindle hole of the body of the pedal is provided with a bearing.

12. The assembling structure of claim 11, wherein each of the bearings is further provided with a washer.

13. The assembling structure of claim 8, wherein the fastener is consisted of a bolt and a washer, and a head of the bolt has a hexagon hole.

* * * * *